US012732854B2

(12) United States Patent
Suh et al.

(10) Patent No.: US 12,732,854 B2
(45) Date of Patent: Sep. 8, 2026

(54) METHOD AND APPARATUS FOR NOTIFYING CHANGE OF NETWORK SLICE IN WIRELESS COMMUNICATION SYSTEM

(71) Applicant: SAMSUNG ELECTRONICS CO., LTD., Suwon-si (KR)

(72) Inventors: Dongeun Suh, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 18/443,173

(22) Filed: Feb. 15, 2024

(65) Prior Publication Data

US 2024/0276286 A1 Aug. 15, 2024

(30) Foreign Application Priority Data

Feb. 15, 2023 (KR) ........................ 10-2023-0020162
Jul. 11, 2023 (KR) ........................ 10-2023-0089738
Aug. 10, 2023 (KR) ........................ 10-2023-0105025

(51) Int. Cl.
*G06F 13/00* (2006.01)
*H04W 28/02* (2009.01)

(52) U.S. Cl.
CPC ... *H04W 28/0226* (2013.01); *H04W 28/0268* (2013.01)

(58) Field of Classification Search
CPC ......... H04W 28/0226; H04W 28/0268; H04W 4/24; H04L 12/1407; H04M 15/66; H04M 15/83; H04M 15/84
USPC ........................................ 709/238, 221, 220
See application file for complete search history.

(56) References Cited

U.S. PATENT DOCUMENTS 12,225,415 B2 * 2/2025 Ianev ................ H04W 36/0011
12,267,772 B2 * 4/2025 Wang .................... H04W 48/18
2019/0313236 A1 10/2019 Lee et al.
2021/0212136 A1 7/2021 Lee et al.
2022/0095153 A1 3/2022 Ha et al.
2022/0240173 A1 * 7/2022 Wang .................... H04W 48/18
2023/0292380 A1 9/2023 Kim et al.
2023/0362766 A1 * 11/2023 Ianev ................ H04W 36/0011
2025/0031138 A1 * 1/2025 Lee ........................ H04W 48/18
2026/0039552 A1 * 2/2026 Suh ..................... H04L 41/0894

FOREIGN PATENT DOCUMENTS

KR 10-2021-0144556 A 11/2021
KR 10-2022-0040407 A 3/2022
WO 2022/001485 A1 1/2022

OTHER PUBLICATIONS

International Search Report and Written Opinion of the International Searching Authority dated May 17, 2024, in connection with International Application No. PCT/KR2024/002098, 8 pages.

(Continued)

*Primary Examiner* — Kenneth R Coulter

(57) ABSTRACT

The disclosure relates to a 5G or 6G communication system for supporting a higher data transmission rate. Disclosed is a method of notifying associated network entities of a change when an existing slice of PDU sessions is replaced with an alternative slice.

14 Claims, 7 Drawing Sheets

(56) References Cited

OTHER PUBLICATIONS

ZTE Wistron, “AMF requests for the PCF policy update of the URSP rules in the UE after the Allowed and/or Configured NSSAI update”, S2-187720, SA WG2 Meeting #128-bis, Sophia Antipolis, France, Aug. 2018, 16 pages.

Supplementary European Search Report dated Mar. 3, 2026, in connection with European Patent Application No. 24757212.6, 13 pages.

ZTE et al., “Support of network slice replacement,” S2-2302982, 3GPP TSG-WG SA2 Meeting #155, Athens, Greece, Feb. 20-24, 2023, 12 pages.

ZTE et al., “Support of network slice replacement,” S2-2301183, 3GPP TSG-WG SA2 Meeting #154AH, Online, Jan. 16-20, 2023, 12 pages.

* cited by examiner

FIG. 1

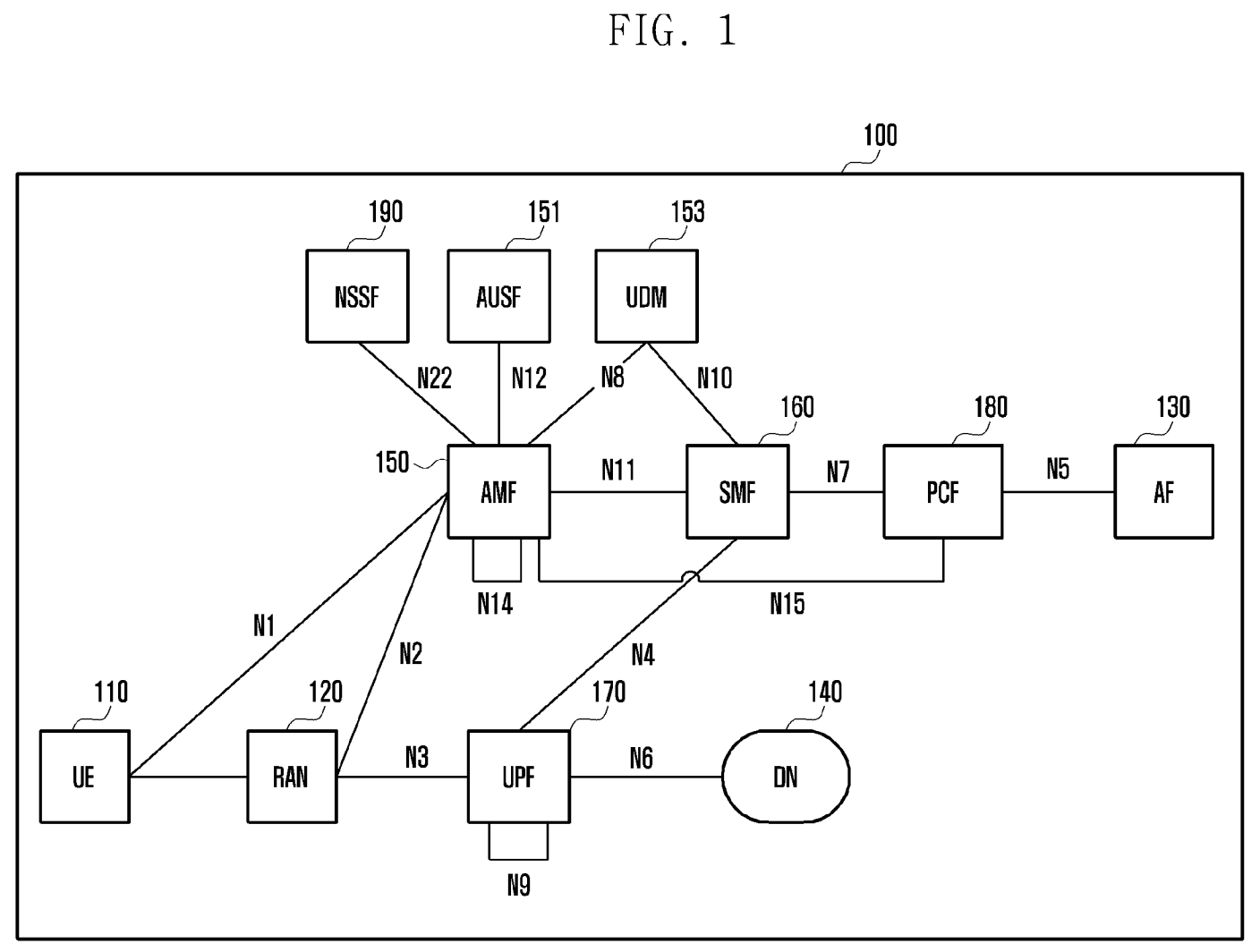

100
130 AF
180 PCF
160 SMF
153 UDM
151 AUSF
190 NSSF
150 AMF
140 DN
170 UPF
120 RAN
110 UE
N1 N2 N3 N4 N5 N6 N7 N8 N9 N10 N11 N12 N14 N15 N22

FIG. 2

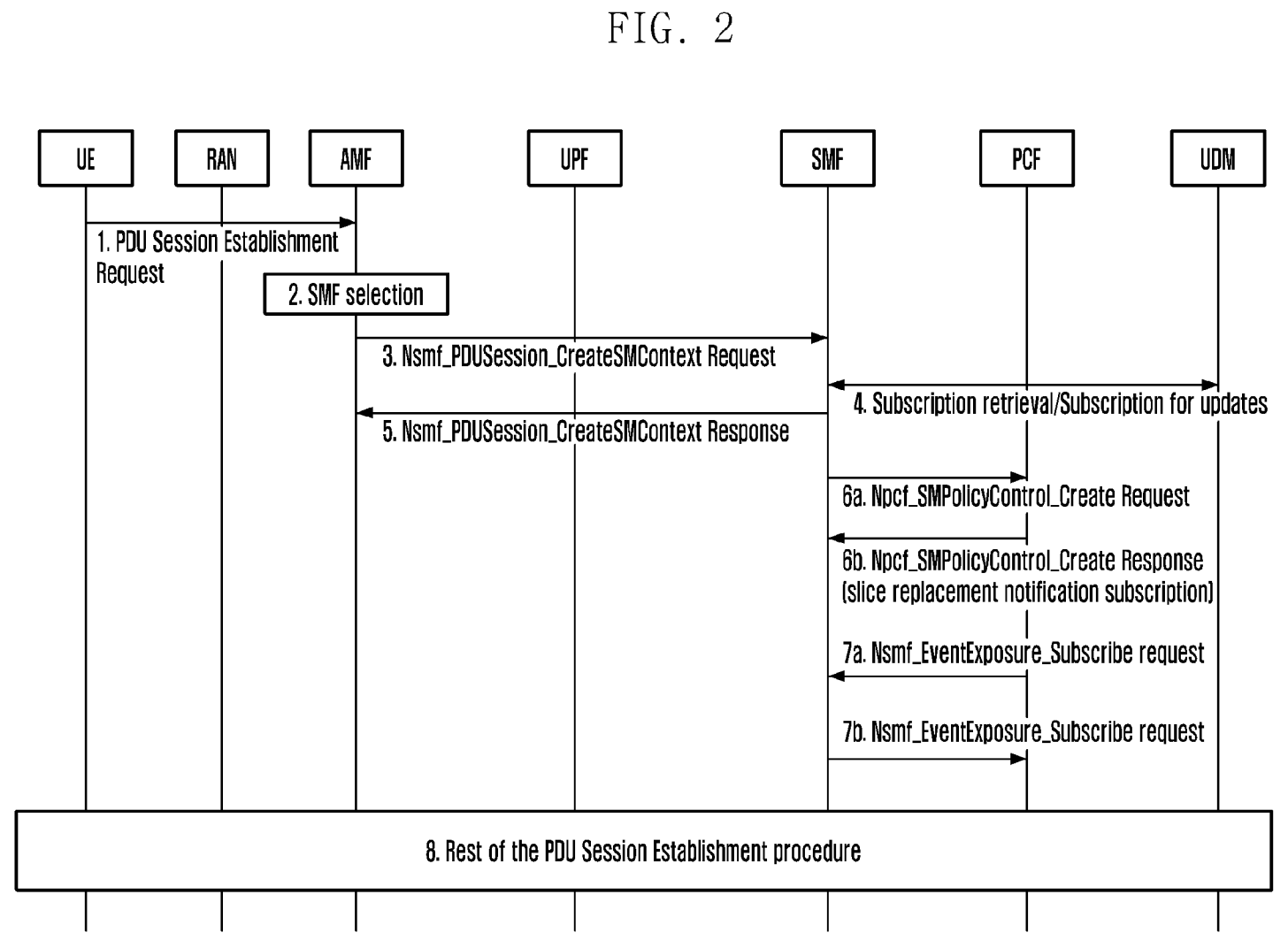

UE
RAN
AMF
UPF
SMF
PCF
UDM

1. PDU Session Establishment Request
2. SMF selection
3. Nsmf_PDUSession_CreateSMContext Request
4. Subscription retrieval/Subscription for updates
5. Nsmf_PDUSession_CreateSMContext Response
6a. Npcf_SMPolicyControl_Create Request
6b. Npcf_SMPolicyControl_Create Response (slice replacement notification subscription)
7a. Nsmf_EventExposure_Subscribe request
7b. Nsmf_EventExposure_Subscribe request
8. Rest of the PDU Session Establishment procedure

METHOD AND APPARATUS FOR NOTIFYING CHANGE OF NETWORK SLICE IN WIRELESS COMMUNICATION SYSTEM

CROSS-REFERENCE TO RELATED APPLICATION

This application is based on and claims priority under 35 U.S.C. § 119 to Korean Patent Application No. 10-2023-0020162, 10-2023-0089738 and 10-2023-0105025, filed on Feb. 15, 2023, Jul. 11, 2023 and Aug. 10, 2023, in the Korean Intellectual Property Office, the disclosure of which is herein incorporated by reference in its entirety.

BACKGROUND

1. Field

The disclosure relates to a method and apparatus for notifying of a change of a network slice in a wireless communication system.

2. Description of Related Art 5G mobile communication technologies define broad frequency bands such that high transmission rates and new services are possible, and can be implemented not only in “Sub 6 GHz” bands such as 3.5 GHz, but also in “Above 6 GHz” bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The 5G mobile communication network is configured with a 5G user equipment (UE), a 5G radio access network (RAN), and a 5G core network. The 5G core network is configured with network functions (NFs) such as an access and mobility management function (AMF) that provides a mobility management function of a UE, a session management function (SMF) that provides a session management function, a user plane function (UPF) that transfers data, a policy control function (PCF) that provides a policy control function, a unified data management (UDM) that provides a function of managing data such as subscription data, policy control data, and the like, a unified data repository (UDR) that stores data of various network functions (NFs) such as a UDM or the like.

The 5G system uses technology called a session and service continuity (SSC) mode that supports session continuity for the purpose of improving quality-of-experience (QoE) or supporting a mission critical service. The SSC may include three modes, SSC mode 3 among the three modes is called by another name, Make-Before-Break. When determining that an SSC mode 3 protocol data unit (PDU) session that a UE currently uses needs to be released, the network may establish a new PDU session capable of replacing the corresponding PDU session, and may release the existing PDU session, so as to support session continuity. Before the existing PDU session is released, the UE moves traffic flows that have been transmitted/received via the existing PDU session to the new PDU session so as to maintain session continuity.

In the 5G system, network slicing technology is the technology and structure that enable various virtualized and independent logic networks in a single physical network. To satisfy specified requirements of a service/application, a network operator may configure a virtual end-to-end network called a network slice, and may provide a service. A network slice is identified by an identifier called single-network slice selection assistance information (S-NSSAI), and the network operator provides a network slice(s) to a UE and enables the UE to receive a service.

Specifically, a UE in the 5G system transmits, to an AMF, identification information (i.e., requested S-NSSAIs) associated with network slices that the UE desires to request when registering in a network, and the AMF may provide, to the UE, information (allowed NSSAI) associated with network slices that the UE is capable of using, in consideration of requested S-NSSAIs, subscription information, and the like. Although the UE does not provide information associated with requested slices, the AMF may provide allowed NSSAI. In this instance, Allowed NSSAI may include information (default configured NSSAI) associated with default slices and information (i.e., default subscribed S-NSSAIs) associated with slices configured as a default configuration among subscribed slices included in the UE subscription information.

When allowed NSSAI is incapable of including any slice (e.g., when default configured NSSAI and default subscribed S-NSSAIs are not present or unavailable), the AMF may transmit, to the UE, a network registration reject message including a cause code indicating that the reason of the rejection is that no available slice is present.

In order to include a slice in allowed NSSAI of a UE, an admission control (network slice admission control (NSAC)) procedure and an authentication (network slice-specific authentication and authorization (NSSAA)) procedure may be performed on the corresponding slice. In the NSAC procedure, whether to allow a predetermined slice may be determined based on the number of UEs that are currently registered in the corresponding slice and the maximum number of registered UEs allowed for the corresponding slice (i.e., determining whether to include the corresponding slice in allowed NSSAI). In the NSSAA procedure, based on credential information associated with the corresponding slice of the UE, an authentication procedure is performed with AAA-S that is a server that performs authentication of the corresponding slice via an NSSAA function (NSSAAF). In this instance, whether to allow the corresponding slice is determined in consideration of an authentication result (i.e., determining whether to include the corresponding slice in allowed NSSAI).

In order to perform data transmission or reception to a predetermined data network (DN) via allowed slices (allowed NSSAIs), the UE may select one of the allowed slices, may request the corresponding slice to establish a packet data unit (PDU) session to a predetermined data network name (DNN), and may perform data transmission or reception via the established PDU session. The PDU session may include various traffic flows, and the traffic flows may include two types of flows, that is, a guaranteed bitrate quality-of-service flow (GBR QoS flow) and a non-GBR QoS flow.

In the 5G system, in the case in which a congestion situation occurs in a slice (e.g., when the number of registered UEs or the number of sessions in a slice reaches the maximum value, when one or more of network functions (NFs) in a slice are overloaded, or the like), in the case in which an operational reason (operation and management (OAM)) associated with a predetermined slice is present, and in the case in which the speed of an application in a slice is decreased, traffic that uses the corresponding slice may be moved to another slice efficiently without causing a user to feel disconnection. A slice in which the above-described problem occurs is referred to as old S-NSSAI, and a slice with which the old S-NSSAI is to be replaced is referred to as alternative S-NSSAI.

A third party that is contracted by a network operator may perform transmission/reception of a message with a network exposure function (NEF) via an application function (AF) and may perform communication with entities in a network. In this instance, the AF may request predetermined S-NSSAI. When a slice is changed as described above, the change needs to be reported to the AF or a request from the AF needs to be appropriately processed based on the change.

The above information is presented as background information only to assist with an understanding of the disclosure. No determination has been made, and no assertion is made, as to whether any of the above might be applicable as prior art with regard to the disclosure.

SUMMARY

An aspect of the disclosure is to propose a method of notifying an associated entity (e.g., an SM PCF or AF) that a previous slice is changed to a new slice when a slice of PDU sessions included in the slice is changed.

In addition, an aspect of the disclosure is to propose a method of processing, based on slice change, a request from an associated entity to a previous slice when a slice of PDU sessions included in the slice is changed.

According to an embodiment of the present disclosure, there is provided a method performed by a policy control function (PCF) in a wireless communication, including receiving, from a session management function (SMF), Session Management (SM) policy control create request message; transmitting, to the SMF, SM policy control create response message including information on policy control request trigger, wherein the policy control request trigger includes network slice replacement; and receiving, from the SMF, alternative single-network slice selection assistance information (S-NSSAI) if a network slice replacement has occurred.

In an embodiment, the method performed by the PCF further comprises receiving, from the SMF, SM policy association ID, in case that the network slice replacement has occurred.

In an embodiment, the method performed by the PCF further comprises receiving, from a network function (NF), subscribe request message for network slice replacement report request; and transmitting, to the NF, an indication for network slice replacement and an alternative S-NSSAI, if the network slice replacement has occurred.

In an embodiment, the receiving the subscribe request message from the NF triggers the PCF to include network slice replacement in the policy control request trigger.

According to an embodiment of the present disclosure, there is provided a method performed by a session management function (SMF) in a wireless communication system, including transmitting, to a policy control function (PCF), Session Management (SM) policy control create request message; receiving, from the PCF, SM policy control create response message including information on policy control request trigger, wherein the policy control request trigger includes network slice replacement; and transmitting, to the PCF, alternative single-network slice selection assistance information (S-NSSAI) if a network slice replacement has occurred.

In an embodiment, the method performed by the SMF further comprises transmitting, to the SMF, SM policy association ID, in case that the network slice replacement has occurred.

In an embodiment, the method performed by the SMF further comprises determining that the network slice replacement has occurred based on SM context update message received from a access management function (AMF).

According to an embodiment of the present disclosure, there is provided a policy control function (PCF) in a wireless communication, comprising a transceiver; and a controller coupled with the transceiver and configured to: receive, from a session management function (SMF), Session Management (SM) policy control create request message, transmit, to the SMF, SM policy control create response message including information on policy control request trigger, wherein the policy control request trigger includes network slice replacement, and receive, from the SMF, alternative single-network slice selection assistance information (S-NSSAI) in case that if a network slice replacement has occurred.

According to an embodiment of the present disclosure, there is provided a policy control function (PCF) in a wireless communication, comprising a transceiver; and a controller coupled with the transceiver and configured to: receive, from a session management function (SMF), Session Management (SM) policy control create request message, transmit, to the SMF, SM policy control create response message including information on policy control request trigger, wherein the policy control request trigger includes network slice replacement, and receive, from the SMF, alternative single-network slice selection assistance information (S-NSSAI) if a network slice replacement has occurred.

According to an embodiment of the disclosure, SM PCF determines a new policy when a slice of a session is changed. In addition, when an AF transmits a request to a previous slice of which replacement has been completed, the corresponding request may be processable based on the fact that the slice is changed.

Before undertaking the DETAILED DESCRIPTION below, it may be advantageous to set forth definitions of certain words and phrases used throughout this patent document: the terms “include” and “comprise,” as well as derivatives thereof, mean inclusion without limitation; the term “or,” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term “controller” means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a diagram illustrating an example of a 5G system architecture including various network entities;

FIG. 2 is a flowchart illustrating a method in which a PCF requests an SMF to transmit a notification when slice change (or slice replacement) occurs, in a PDU session establishment procedure;

DETAILED DESCRIPTION

Figure 3:
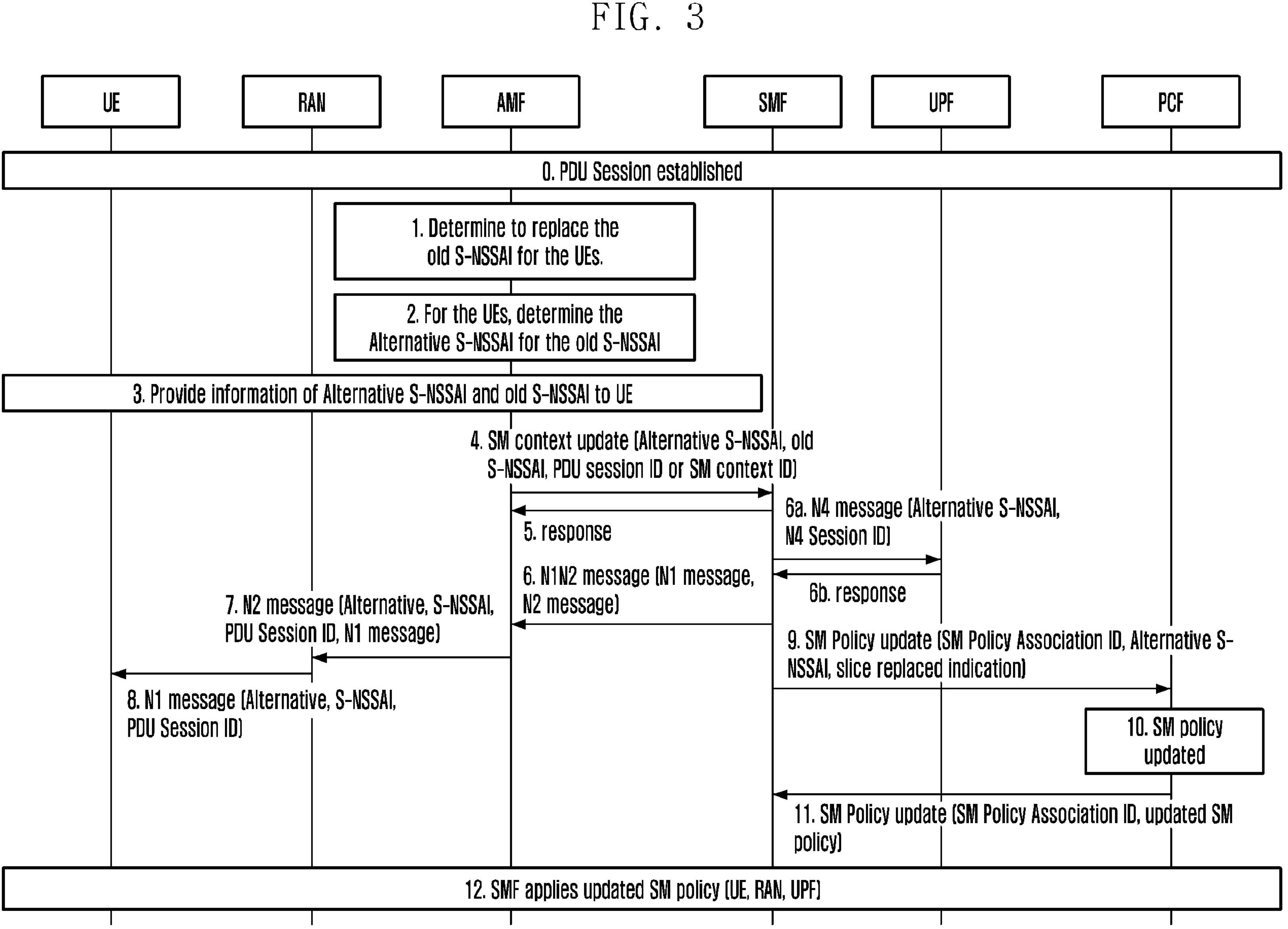
FIG. 3 is a flowchart illustrating a method in which an SMF notifies a PCF of slice change.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

FIGS. 1 to 7 discussed below and various embodiments for describing the principles of the present disclosure in this patent document are only for illustration and should not be interpreted as limiting the scope of the disclosure in any way. Those skilled in the art will understand that the principles of the present disclosure can be implemented in any suitably arranged system or device.

The 5G mobile communication network is configured with a 5G user equipment (UE) (terminal), a 5G radio access network (RAN) (base station), a 5g nodeB (gNB), an evolved nodeB (eNB or the like), and a 5G core network. The 5G core network is configured with network functions (NFs) such as an access and mobility management function (AMF) that provides a mobility management function of a UE, a session management function (SMF) that provides a session management function, a user plane function (UPF) that transfers data, a policy control function (PCF) that provides a policy control function, a unified data management (UDM) that provides a function of managing data such as subscription data, policy control data, and the like, a unified data repository (UDR) that stores data of various network functions (NFs) such as a UDM or the like.

In the 3GPP system, a conceptual link that connects NFs in the 5G system is defined as a reference point. Examples of a reference point included in a 5G system architecture expressed in FIG. 1 are as follows.

N1: a reference point between a UE and an AMF

N2: a reference point between an (R)AN and an AMF

N3: a reference point between an (R)AN and a UPF

N4: a reference point between an SMF and a UPF

N5: a reference point between a PCF and an AF

N6: a reference point between a UPF and a DN

N7: a reference point between an SMF and a PCF

N8: a reference point between a UDM and an AMF

N9: a reference point between two core UPFs

N10: a reference point between a UDM and an SMF

N11: a reference point between an AMF and an SMF

N12: a reference point between an AMF and an AUSF

N13: a reference point between a UDM and an authentication server function (AUSF)

N14: a reference point between two AMFs

N15: a reference point between a PCF and an AMF in the case of a non-roaming scenario, and a reference point between a PCF and an AMF in a visited network in the case of a roaming scenario In the 5G system, network slicing technology is the technology and structure that enable various virtualized and independent logic networks in a single physical network. To satisfy specified requirements of a service/application, a network operator may configure a virtual end-to-end network called a network slice, and may provide a service. In this instance, a network slice is identified by an identifier called single-network slice selection assistance information (S-NSSAI). A network transmits a slice set (e.g., allowed NSSAI(s)) allowed to a UE in a UE registration procedure (e.g., UE registration procedure), and the UE transmits or receives application data via a protocol data unit (PDU) session established via one S-NSSAI (i.e., a network slice) among them.

FIG. 2 illustrates a method in which a PCF requests an SMF to transmit a notification when slice change (or slice replacement) occurs, in a PDU session establishment procedure.

1. UE may determine to perform a PDU session establishment procedure. The UE transmits a PDU session establishment request message to an AMF, and requests establishment of a new PDU session. In this instance, the UE may include a PDU session ID, S-NSSAI, and a DNN in the request message.
2. The AMF performs an SMF selection procedure to select an SMF for a PDU session.

3. The AMF transmits Nsmf_PDUSession_CreateSM-Context Request to the SMF. In the corresponding message, a PDU session ID, an SM context ID, S-NSSAI, a DNN, and the like may be included.
4. The SMF may receive subscription information related to a session of the UE (i.e., session management subscription data) from a UDM.

Specifically, the SMF requests the corresponding data by transmitting a Nudm_SDM_Get (SUPI, session management subscription data, selected DNN, S-NSSAI of the HPLMN, Serving PLMN ID, [NID]) Request message to the UDM, and requests subscription by transmitting a Nudm_SDM_Subscribe (SUPI, session management subscription data, selected DNN, S-NSSAI of the HPLMN, Serving PLMN ID, [NID]) Request message.

When receiving the data request message from the SMF, the UDM may obtain the corresponding data from a UDR and may transmit the same to the SMF.

5. The SMF may transmit a Nsmf_PDUSession_CreateSMContext Response message to the AMF as a response message to step 3.

6a. The SMF selects a PCF, and performs a session management (SM) policy association establishment procedure with the PCF in order to obtain a policy for the PDU session.

The SMF may transmit a Npcf_SMPolicyControl_Create Request message to the PCF.

6b. When at least one of the following conditions is satisfied, the PCF may include, in a Npcf_SMPolicyControl_Create Response message transmitted to the SMF, information (e.g., PCR trigger for slice replacement) indicating, to the SMF, a need of reporting a change to the PCF when a slice for the PDU session is changed.

When the PCF recognizes that the SMF is an SMF that supports a slice replacement function from messages received from the SMF in step 6a and the like (e.g., the PCF performs determination based on a supported feature IE, a capability indication, or the like)

When the PCF receives a request for subscription to slice change (or replacement) from the AF In addition, the PCF may include a policy and charging control (PCC) rule in the Npcf_SMPolicyControl_Create Response message.

When information indicating a need of reporting a change when a slice for the PDU session is changed is included in the Npcf_SMPolicyControl_Create Response message received from the PCF, the SMF may transmit a message to the PCF when the slice for the corresponding PDU session is changed in the future. In this instance, the corresponding message may include one or more among changed slice information (i.e. alternative S-NSSAI), the fact that a slice is changed, and previous slice information (old S-NSSAI).

7a. In the case in which the PCF does not transmit, to the SMF, information indicating a need of reporting a change to the PCF when slice change occurs in an SM policy association procedure (i.e., steps 6a and 6b), and one or more of the following conditions are satisfied, the PCF may transmit, to the SMF, a subscription request message including an event ID indicating slice change.

When the PCF recognizes that the SMF is an SMF that supports a slice replacement function (from messages received from the SMF in step 6a and the like) (e.g., the PCF performs determination based on a supported feature IE, a capability indication, or the like.)

When the PCF receives, from the AF, a request for subscription to slice change (or replacement)

7b. The SMF transmits a response message to the PCF.

When the event ID associated with a change of a slice of a PDU session is included in the Nsmf_EventExposure_Subscribe request message received from the PCF, the SMF may transmit a message to the PCF when a slice for the corresponding PDU session is changed in the future. In this instance, the corresponding message may include one or more among changed slice information (i.e. alternative S-NSSAI), the fact that a slice is changed, and previous slice information (old S-NSSAI).

8. The remaining PDU session procedure is performed.

FIG. 3 illustrates a method in which an SMF notifies a PCF of slice change.

Step 0. A PDU session procedure is performed. A UE requests PDU session establishment by transmitting a message including a PDU session ID, S-NSSAI, and a DNN to an AMF. The AMF may include information received from the UE in an SM Context Create message and may transmit the same to an SMF. The SMF transmits, to a PCF, a message for requesting an SM policy. In this instance, via the corresponding message or a separate message, the SMF may transmit information indicating that the SMF is an SMF that supports slice replacement. When the SMF supports slice replacement, the PCF may include, in a message transmitted to the SMF, subscription information indicating a need of reporting a change when slice change occurs together with the SM policy, and may transmit the same. The SMF may perform the remaining PDU session establishment procedure based on the information received from the PCF.

Step 1. The AMF may determine that a predetermined S-NSSAI(s) needs to be changed to another S-NSSAI for the whole or part of PDU sessions included in the corresponding S-NSSAI. The AMF may perform the determination based on information included in a message received from an NWDAF, an NSACF, a PCF, an OAM, or an NG-RAN. In this instance, the S-NSSAI needs to be replaced is referred to as old S-NSSAI.

Step 2. With respect to the old S-NSSAI of which replacement is determined in step 1, the AMF determines alternative S-NSSAI of UEs included in the old S-NSSAI. In this instance, S-NSSAI determined as the alternative S-NSSAI may be different for each UE.

Step 3. The AMF may include alternative S-NSSAI in allowed NSSAI and/or configured NSSAI when the alternative S-NSSAI is not included for the UEs that determine the alternative S-NSSAI in step 2, and may transmit mapping information between old S-NSSAI and alternative S-NSSAI to the UE via a UE configuration update message.

Step 4. In association with each PDU session for which a change is determined to be made (i.e., PDU sessions associated with the old S-NSSAI), the AMF may include one or more pieces of information among the following information in a message transmitted to the SMF that is in charge of the corresponding PDU session.

Alternative S-NSSAI: indicates the alternative S-NSSAI determined in step 2.

SM context ID or PDU session ID: indicates an ID or a PDU session identifier that identifies communication for a predetermined SM context between an SMF and an AMF.

old S-NSSAI: indicates previous S-NSSAI.

Mode for replacement: indicates one among the use of an existing PDU session, establishment of a new PDU session after releasing an existing session (break-before-make), and establishment of a new PDU session before releasing an existing session (make-before-break). The name of the corresponding parameter is not limited to a mode for replacement, and may be called by another name.

Step 5. The SMF transmits, to the AMF, a response message to the message received in step 4.

Step 6a. When the SMF supports the alternative S-NSSAI included in the message received in step 4, when the SMF determines, based on a local configuration, to use the existing PDU session as it is, or when the mode for replacement of the message received in step 5 indicates the use of the existing PDU session, the SMF may transmit an N4 message received in step 4 to a UPF. The alternative S-NSSAI and N4 session ID may be included in the corresponding message.

Step 6b. When receiving the corresponding message, the UPF may change S-NSSAI for the N4 session to the alternative S-NSSAI, and may transmit a response message to the SMF.

Step 6. When the SMF supports the alternative S-NSSAI included in the message received in step 4, when the SMF determines, based on a local configuration, to use the existing PDU session as it is, or when the mode for replacement of the message received in step 5 indicates the use of the existing PDU session, the SMF may transmit the alternative S-NSSAI to a RAN and the UE.

The SMF may include an N1 message and an N2 message transmitted to the UE in a message transmitted to the AMF, and the corresponding message may include the following information.

N1 message: PDU session modification command (PDU session ID, Alternative S-NSSAI, Cause)

N2 message: PDU session ID, Alternative S-NSSAI, Cause

Step 7. The AMF transmits, to the RAN, the N2 message including the N1 message of the message received in step 6. When a PDU session ID (or another identification information capable of identifying a PDU session) and alternative S-NSSAI are included in the N2 message, the RAN may change the S-NSSAI of the corresponding PDU session to the alternative S-NSSAI.

Step 8. When the N1 message is included in the message received in step 7, the RAN may transmit the corresponding N1 message to the UE. When a PDU session ID (or another identification information capable of identifying a PDU session) and alternative S-NSSAI are included in the N2 message, the UE may change the S-NSSAI of the corresponding PDU session to the alternative S-NSSAI.

Step 9. When the PCF transmits, to the SMF, a subscription request indicating, to the SMF, a need of reporting an alternative slice (alternative S-NSSAI) when slice change occurs in the PDU session establishment procedure, or when the SMF autonomously makes decision and performs slice change based on the message received from the AMF in step 4, a message transmitted to the PCF may include one or more pieces of information among the following information.

SM policy association ID: indicates an SM policy association ID established between an SMF and a PCF for a PDU session in a PDU session establishment procedure.

Alternative S-NSSAI: indicates the alternative S-NSSAI received from the AMF in step 4.

Slice replaced indication: indicates that a slice is changed.

Step 10. When recognizing, based on the message received in step 9, that slice replacement is completed or is to be performed, the PCF may determine whether policy information corresponding to the SM policy association ID needs to be updated. When the alternative S-NSSAI is included in the message received in step 9, the PCF may request subscription information corresponding to the alternative S-NSSAI from a UDR, and may receive the same from the UDR. The PCF may update the SM policy based on the subscription information corresponding to the alternative S-NSSAI and/or the alternative S-NSSAI.

Step 11. When a new SM policy is determined in step 10, the PCF may include the following information in a message transmitted to the SMF in order to apply the new SM policy.

SM Policy Association ID, Updated SM Policy

Step 12. To apply the SM policy received in step 11, the SMF may transmit a message to the UE, RAN, and UPF.

Figure 4:
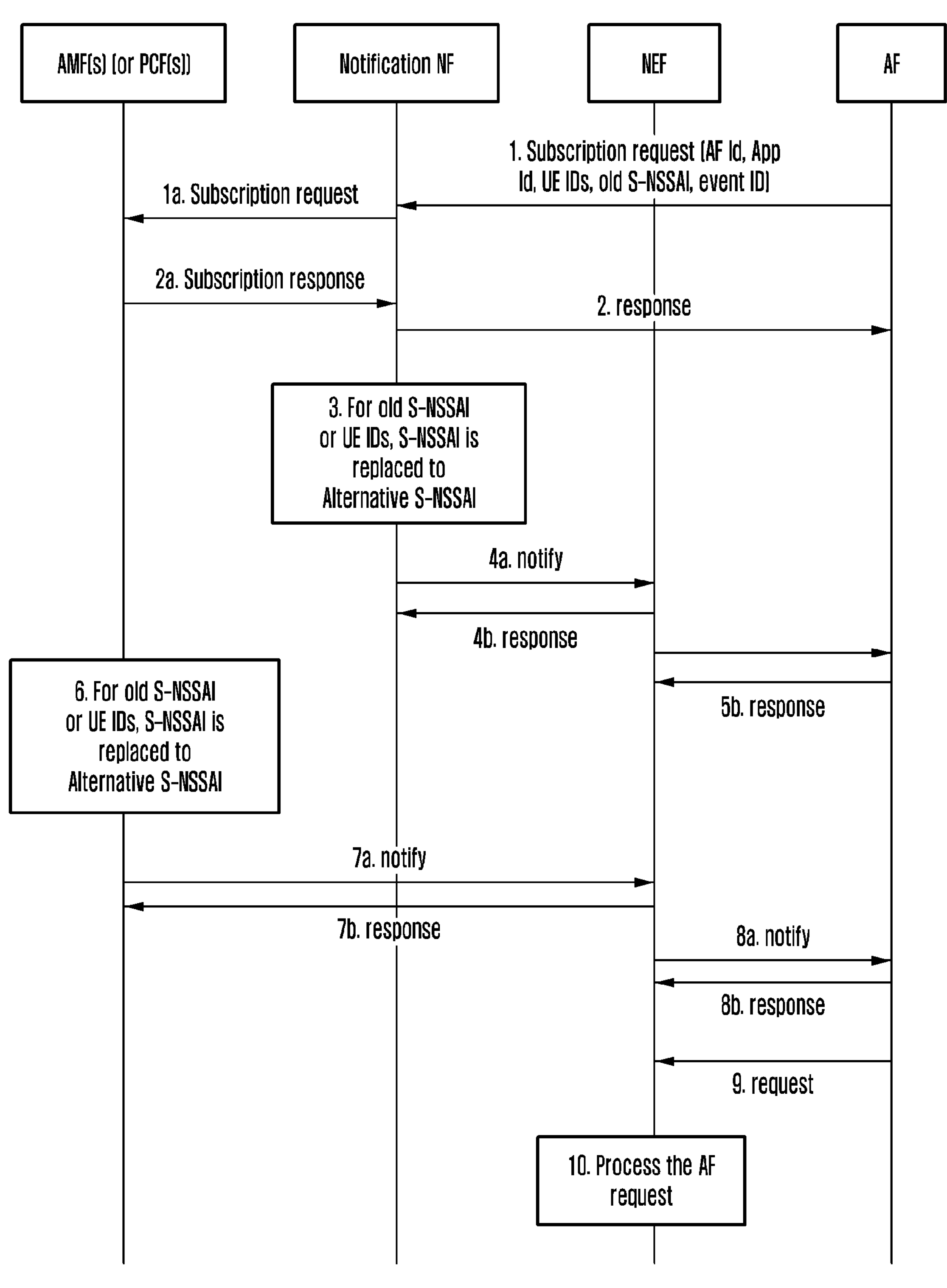
FIG. 4 is a flowchart illustrating a method in which an AF requests, from a notification NF, subscription to slice change, and receives a slice change notification.

FIG. 4 illustrates a method in which an AF requests, from a notification NF, subscription to slice change, and receives a slice change notification.

In FIG. 4, the notification NF may be one or more among an AMF, an SMF, a UDM, a UDR, a PCF, and a network slice selection function (NSSF).

1. An AF may transmit a subscription request message including at least one of the following information to the notification NF via an NEF. In the case in which the message is a subscription request associated with a plurality of UEs, the corresponding message may be transmitted to a UDM (i.e., in this instance, the notification NF may be configured as a UDM).
   - AF Id: indicates the identifier of an AF.
   - App id: indicates the identifier of an application.
   - Event ID: indicates the identifier of an event associated with slice change or slice availability change. Slice change and slice availability change may be expressed by separate event identifiers, respectively, or may be expressed by a single identifier.
   - S-NSSAI (e.g., old S-NSSAI in the drawing): indicates a slice identifier. When reporting a change of a predetermined slice or a change in availability of a predetermined slice (e.g., the case in which a slice is changed to be unavailable) is requested, the corresponding information may be included.
   - UE IDs: indicate identification information of UEs. When reporting slice change of predetermined UEs is requested, the corresponding information may be included.

When the request message from the AF does not include both S-NSSAI and UE IDs, the NEF may include, based on configuration information, slice identification information (e.g., S-NSSAI) mapped to an AF Id or App ID in the subscription request message transmitted to the notification NF.

1a. In the case in which the notification NF is a UDM in FIG. 4, the UDM may transmit, based on the information included in the subscription request message received in step 1, the subscribe request message associated with slice change or slice availability change to an AMF(s) that is in charge of the UEs associated with the subscription request (i.e., an AMF in which each UE is registered is an AMF that is in charge of the corresponding UE, and thus a plurality of AMFs (serving AMFs) may be present when a plurality of UEs are present). In a message transmitted from the notification NF to each AMF, a notification endpoint (i.e., address information for receiving a notification) configured as an NEF address (or AF address) may be included. According to an embodiment, in the subscription request message in step 1a, UE ID(s) (e.g., SUPI) of UEs that the corresponding AMF is responsible for may be included, instead of UE ID(s) included in the subscription request message in step 1.

2a. When receiving the subscription request message of step 1a from the UDM, each AMF may transmit, to the UDM, a response message including a result (success or failure) of processing the subscription request.

2. The notification NF transmits a response message including a result (success or failure) of processing the subscription request to the AF via the NEF. In the case in which the notification NF is the UDM and transmits the subscription message to the AMF(s) in step 1a, if the UDM receives a response message from the AMF(s), the UDM transmits, to the AF via the NEF, a response message including a result (success or failure) of processing the subscription request received in step 1.

3. The notification NF detects a slice change or slice availability change event corresponding to the subscription request received in step 1.

When the notification NF is a PCF, and the PCF receives a policy update message for network slice change from an SMF (e.g., when a message for requesting update of S-NSSAI of the existing SM policy to alternative S-NSSAI is received), the PCF may determine that slice change has occurred.

In the case in which the notification NF is an AMF, the AMF may determine that slice change occurs when a network slice replacement event occurs with respect to UEs that are monitored in association with slice change (replacement) or slice availability change event. The occurrence of the network slice replacement event may correspond to, for example, the case in which the AMF updates configuration information (e.g., mapping of alternative S-NSSAI (information including a mapping relationship between S-NSSAI and alternative S-NSSAI and indicating use of alternative S-NSSAI instead of S-NSSAI), allowed NSSAI including alternative S-NSSAI, and configured NSSAI including alternative S-NSSAI) for a UE for network slice replacement. The occurrence of the slice availability change event may correspond to the case in which the AMF configuration information is updated or the AMF receives slice availability change information from the NSSF or PCF.

4a. In the case in which there is subscription to an event associated with slice change (or slice replacement) or slice availability change of step 3, and it is determined that the slice change or slice availability change has occurred in step 3, the notification NF may transmit a notification message associated with the slice change to the NEF. In the state in which S-NSSAI corresponding to subscription is changed to be unavailable, and alternative S-NSSAI for the corresponding slice is determined, the alternative S-NSSAI may be included in the notification message that the notification NF transmits. In the state in which S-NSSAI corresponding to subscription is changed to be unavailable, and alternative S-NSSAI for the corresponding slice is not determined, availability information, as opposed to the alternative S-NSSAI, may be included in the notification message that the notification NF transmits.

The notification NF may include at least one piece of information among the following information in the notification message transmitted to the NEF.

AF Id: indicates the identifier of an AF.

App id: indicates the identifier of an application.

S-NSSAI (e.g., old S-NSSAI in the drawing): indicates the slice identifier of a slice of which availability is changed or the slice identifier of a slice that is replaced with alternative S-NSSAI.

Alternative S-NSSAI: indicates an alternative slice identifier.

UE IDs: indicate the identifiers of UEs of which a slice is changed.

Slice replaced indication: an identifier indicating that a slice is replaced.

Notification Correlation ID: an identifier associated with an event notification.

availability information: indicates one of information indicating that a slice is available (e.g., slice available) or information indicating that a slice is unavailable (i.e., slice unavailable). For example, in the case in which a slice is changed from an available state to an unavailable state, information indicating that the slice is unavailable may be included.

Step 4b. The NEF transmits a response message to the notification NF.

Step 5a. The NEF may transmit, to the AF, information included in the notification message received in step 4a. Specifically, when subscription of an AF to an event associated with slice change or slice availability change is present in association with S-NSSAI included in the notification message received in step 4a, or when an AF associated with S-NSSAI included in the notification message received in step 4a is present (e.g., when an App ID or AF ID corresponding to the S-NSSAI is stored in NEF configuration information), the NEF may transmit information included in the message received in step 4a to the corresponding AF.

Step 5b. The AF may transmit a response message to the NEF in response to the notification message received in step 5a.

Step 6. The AMF or PCF may detect a slice replacement event or a slice availability change event.

In the case in which a network slice replacement event occurs with respect to UEs that are monitored in association with a slice change (replacement) or slice availability change event, the PCF may determine that slice change has occurred when receiving a policy update message for network slice replacement from the SMF (e.g., when receiving a message that requests updating of S-NSSAI of the existing SM policy to alternative S-NSSAI).

In the case in which a network slice replacement event occurs with respect to UEs that are monitored in association with a slice change (replacement) or slice availability change event, the AMF may determine that slice change has occurred. The occurrence of the network slice replacement event may correspond to, for example, the case in which the AMF updates configuration information (e.g., mapping of alternative S-NSSAI (information including a mapping relationship between S-NSSAI and alternative S-NSSAI and indicating use of alternative S-NSSAI instead of S-NSSAI), allowed NSSAI including alternative S-NSSAI, and configured NSSAI including alternative S-NSSAI) for a UE for network slice replacement. The occurrence of the slice availability change event may correspond to, for example, the case in which the AMF configuration information is updated or the AMF receives slice availability change information from the NSSF or PCF.

Step 7a. When determining that slice change or slice availability change has occurred in step 6, the AMF or PCF may transmit a notification message associated with the slice change or slice availability change to the NEF. In the case in which the information received in step 1a includes a notification endpoint and the corresponding information indicates the AF, the AMF or PCF may directly transmit to the notification message to the AF.

In the state in which S-NSSAI corresponding to subscription is changed to be unavailable, and alternative S-NSSAI for the corresponding slice is determined, the alternative S-NSSAI may be included in the notification message that the notification NF transmits. In the state in which S-NSSAI corresponding to subscription is changed to be unavailable, and alternative S-NSSAI for the corresponding slice is not determined, availability information, as opposed to alternative S-NSSAI, may be included in the notification message that the notification NF transmits.

The AMF (or PCF) may include at least one piece of information among the following information in the notification message transmitted to the UDM (i.e., notification NF).

AF Id: indicates the identifier of an AF.

App id: indicates the identifier of an application.

S-NSSAI (e.g., old S-NSSAI in the drawing): indicates the slice identifier of a slice of which availability is changed or the slice identifier of a slice that is replaced with alternative S-NSSAI.

Alternative S-NSSAI: indicates an alternative slice identifier.

UE IDs: indicate the identifiers of UEs of which a slice is changed.

Slice replaced indication: an identifier indicating that a slice is replaced.

Notification Correlation ID: an identifier associated with an event notification.

availability information: indicates one of information indicating that a slice is available (e.g., slice available) or information indicating that a slice is unavailable (i.e., slice unavailable). For example, in the case in which a slice is changed from an available state to an unavailable state, information indicating that a slice is unavailable may be included.

Step 7b. The NEF may transmit a response message to the AMF (or PCF) in response to the message in step 7a.

Step 8a. The NEF may transmit, to the AF, information included in the notification message received in step 7a. Specifically, when subscription of an AF to an event associated with slice change or slice availability change is present in association with S-NSSAI included in the notification message received in step 7a, or when an AF associated with S-NSSAI included in the notification message received in step 7a is present (e.g., when an App ID or AF ID corresponding to the S-NSSAI is stored in NEF configuration information), the NEF may transmit information included in the message received in step 7a to the corresponding AF.

Step 8b. The AF may transmit a response message to the NEF in response to step 8a.

Step 9. When receiving an AF ID or App ID (additionally UE IDs) and alternative S-NSSAI in step 5a (or step 8a), the AF may include alternative S-NSSAI, instead of S-NSSAI), in a request message (e.g., a request for producing QoS associated with AFSession, traffic influence request, and the like) transmitted to the NEF. The corresponding message may include an App ID, an AF ID, UE IDs, or the like.

Step 10. The NEF may process a request from the AF.

Figure 5:
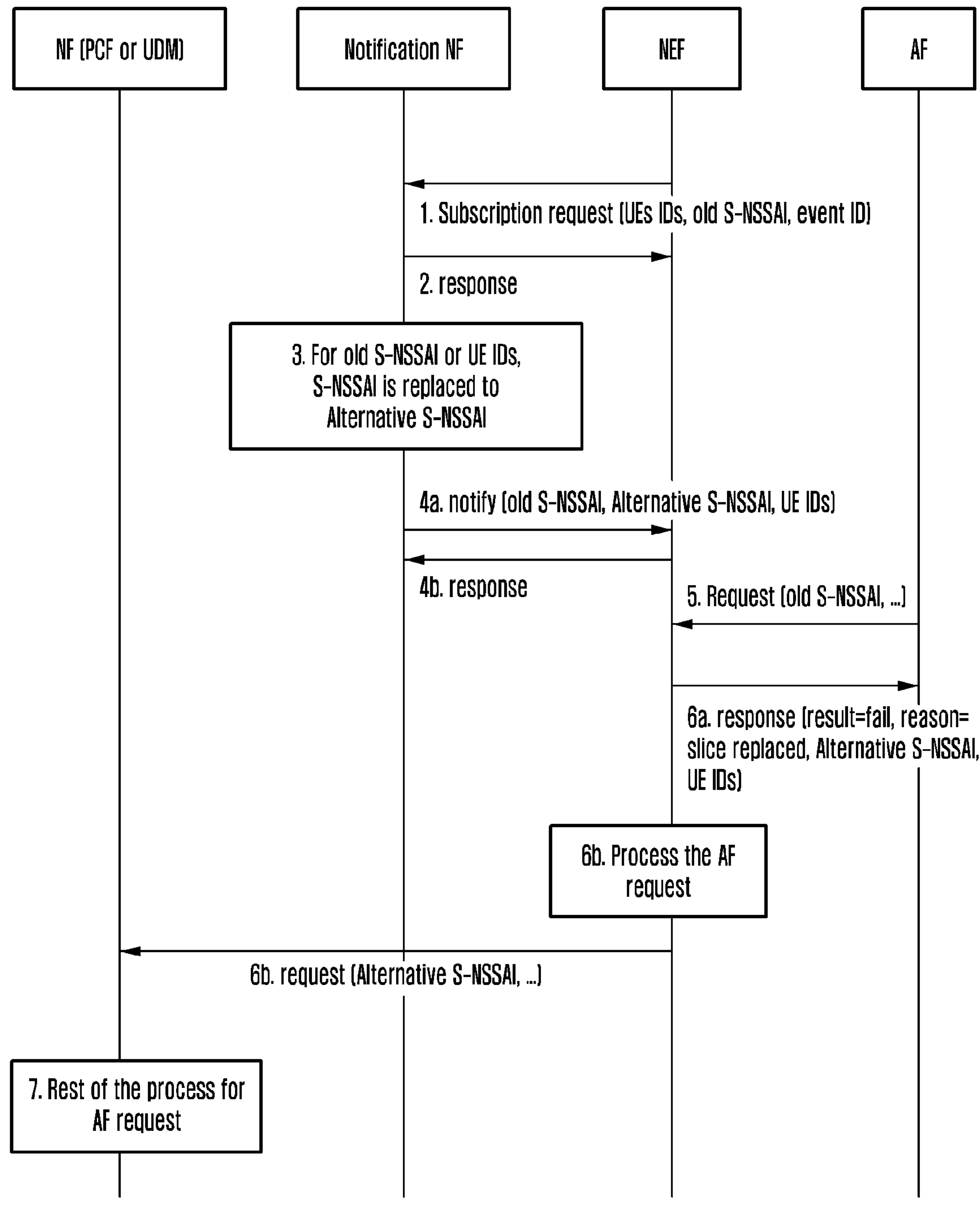
FIG. 5 is a flowchart illustrating a method in which an NEF requests, from a notification NF, subscription to slice change, and receives a slice change notification.

FIG. 5 is a flowchart illustrating a method in which an NEF requests, from a notification NF, subscription to slice change, and receives a slice change notification. In FIG. 5, the notification NF may correspond to one or more among an AMF, an SMF, a UDM, a UDR, a PCF, and a network slice selection function (NSSF).

1. An NEF may transmit, to a notification NE, a subscription message including one or more pieces of information among the following information. The NEF may receive a request from an AF and then, may transmit the corresponding message.

AF Id: indicates the identifier of an AF.

App id: indicates the identifier of an application.

Event ID: indicates the identifier of an event associated with slice change or slice availability change. Slice change and slice availability change may be expressed by separate event identifiers, respectively, or may be expressed by a single identifier.

S-NSSAI (e.g., old S-NSSAI in the drawing): indicates a slice identifier. When reporting whether a change occurs in a predetermined slice or in availability of a predetermined slice (e.g., the case in which a slice is changed to be unavailable) is requested, the corresponding information may be included.

UE IDs: indicate identification information of UEs. When reporting slice change of predetermined UEs is requested, the corresponding information may be included.

When the request message from the AF does not include both S-NSSAI and UE IDs, the NEF may include, based on configuration information, slice identification information mapped to an AF Id or App ID in the subscription request message transmitted to the notification NF.

2. The notification NF transmits a response message including a result (success or failure) of processing the subscription request to the NEF.

3. The notification NF detects a slice change or slice availability change event corresponding to the subscription request received in step 1.

4a. In the case in which subscription associated with slice change (or slice replacement) (or slice availability change) of step 3 is present, the notification NF may transmit a notification message associated with slice change to the NEF. In the state in which S-NSSAI corresponding to subscription is changed to be unavailable, and alternative S-NSSAI for the corresponding slice is determined (i.e., in the case of slice change), the alternative S-NSSAI may be included in the notification message that the notification NF transmits. In the state in which S-NSSAI corresponding to subscription is changed to be unavailable, and alternative S-NSSAI for the corresponding slice is not determined (i.e., in the case of slice availability change), availability information, as opposed to the alternative S-NSSAI, may be included in the notification message that the notification NF transmits.

The notification NF may include at least one piece of information among the following information in the notification message transmitted to the NEF.

AF Id: indicates the identifier of an AF.

App id: indicates the identifier of an application.

S-NSSAI (e.g., old S-NSSAI in the drawing): indicates the slice identifier of a slice of which availability is changed or the slice identifier of a slice that is replaced with alternative S-NSSAI.

Alternative S-NSSAI: indicates an alternative slice identifier.

UE IDs: indicate the identifiers of UEs of which a slice is changed.

Slice replaced indication: an identifier indicating that a slice is replaced.

availability information: indicates one of information indicating that a slice is available (e.g., slice available) or information indicating that a slice is unavailable (i.e., slice unavailable). For example, in the case in which a slice is changed from an available state to an unavailable state, information indicating that a slice is unavailable may be included.

Notification Correlation ID: an identifier associated with an event notification.

Based on the notification message received in step 4a, the NEF stores that S-NSSAI for an AF Id, App Id, UE IDs is changed to alternative S-NSSAI.

Step 4b. The NEF transmits a response message to the notification NF.

Step 5. The AF may include old S-NSSAI in a request message (e.g., a request for producing QoS for AFSession, a traffic influence request, or the like) transmitted to the NEF. The corresponding message may include an App ID, an AF ID, UE IDs, or the like.

Step 6a. In the case in which the S-NSSAI in the message received from the AF in step 5 is one of a slice(s) replaced or a slice(s) which is not replaced but is unavailable, the NEF may include one or more pieces of information among the following information in a response message transmitted to the AF.

result: includes a result indicating failure.

reason: indicates slice change in the case in which a slice is changed in terms of the S-NSSAI included in the message received in step 5. In the case in which the slice is unavailable for the S-NSSAI included in the message received in step 5, this may indicate that a slice is unavailable.

Alternative S-NSSAI: includes corresponding alternative slice identification information in the case in which an AF Id, App ID (additionally UE IDs) or the like are included in the request received in step 5, and corresponding alternative slice information is received in step 4a (i.e., in the case of slice change).

UE IDs: includes UE IDs of which a slice is changed.

Step 6b. In the case in which the S-NSSAI received from the AF in step 5 is a slice(s) that is replaced or a slice(s) which is not replaced but unavailable, the NEF may include alternative S-NSSAI, instead of the S-NSSAI received from the AF in step 5, in the message transmitted to another NF in order to process the request from the AF.

Step 7. In the case in which the alternative S-NSSAI is included in the message from the NEF, the NF (e.g., the PCF, UDM, or the like) may recognize that the request message received from the NEF is associated with the alternative S-NSSAI and may perform processing.

Figure 6:
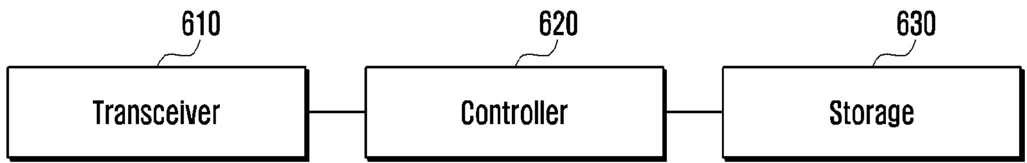
FIG. 6 is a diagram illustrating the structure of a user equipment (UE) according to an embodiment of the disclosure.

FIG. 6 is a diagram illustrating the structure of a UE according to an embodiment of the disclosure.

Referring to FIG. 6, the UE may be configured with a transceiver 610, a controller 620, and a storage 630. In the disclosure, the controller may be defined as a circuit, an application-specified integrated circuit, or at least one processor.

The transceiver 610 may perform signal transmission or reception with another network entity. The transceiver 610 may receive system information, for example, from a base station, and may receive a synchronization signal or a reference signal.

The controller 620 may control overall operation of the UE according to the embodiments of the disclosure. For example, the controller 620 may perform control so as to move traffic flows that have been transmitted or received via an existing PDU session to a new PDU session before releasing the existing PDU sessions, whereby the UE maintains session continuity.

The storage 630 may store at least one piece of information among information transmitted or received via the transceiver 610 and information produced by the controller 620. For example, the storage 630 may store information associated with a network slice, such as S-NSSAI or the like.

Figure 7:
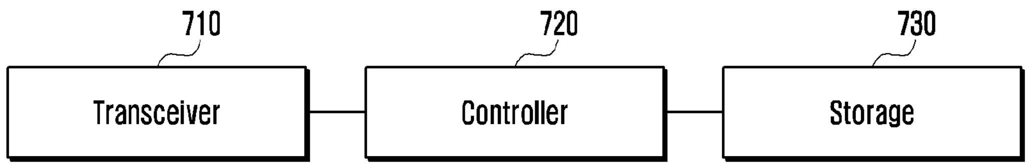
FIG. 7 is a diagram illustrating the structure of a network entity according to an embodiment of the disclosure.

FIG. 7 is a diagram illustrating the structure of a network entity according to an embodiment of the disclosure.

As described above, the network entity of FIG. 7 may be one of the NFs such as an AMF, an SMF, a PCF, a UDM, a UPF, an NEF, and an AF.

Referring to FIG. 7, the network entity may be configured with a transceiver 710, a controller 720, and a storage 730. In the disclosure, the controller may be defined as a circuit, an application-specified integrated circuit, or at least one processor.

The transceiver 710 may perform signal transmission or reception with another network entity. The transceiver 710 may receive a signal from, for example, a UE or another network entity.

The controller 720 may control overall operation of a network entity according to the embodiments of the disclosure. Specifically, the controller 720 may control a signal flow among blocks so as to perform operation in the flowcharts of FIGS. 2 to 5.

The storage 730 may store at least one piece of information among information transmitted or received via the transceiver 710 and information produced by the controller 720. For example, the storage 730 may store information associated with a PDU session ID, a DNN, an SM context ID, old S-NSSAI, alternative S-NSSAI, or the like.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, at least a part of each of the embodiments of the disclosure may be combined with each other and operated by a base station, a terminal, or a specific network entity.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

What is claimed is:

1. A method performed by a policy control function (PCF) in a wireless communication system, the method comprising:

receiving, from a session management function (SMF), a Session Management (SM) policy control create request message;

transmitting, to the SMF, an SM policy control create response message including information on a policy control request trigger, wherein the policy control request trigger includes network slice replacement; and receiving, from the SMF, information associated with an alternative single-network slice selection assistance information (S-NSSAI) a if the network slice replacement has occurred.

2. The method of claim 1, further comprising:

receiving, from the SMF, an SM policy association ID, if the network slice replacement has occurred.

3. The method of claim 1, further comprising:

receiving, from a network function (NF), a subscribe request message for a network slice replacement report request; and transmitting, to the NF, an indication for the network slice replacement and the alternative S-NSSAI, if the network slice replacement has occurred.

4. The method of claim 3, wherein the reception of the subscribe request message from the NF triggers the PCF to include the network slice replacement in the policy control request trigger.

5. A method performed by a session management function (SMF) in a wireless communication system, the method comprising:

transmitting, to a policy control function (PCF), a Session Management (SM) policy control create request message;

receiving, from the PCF, an SM policy control create response message including information on a policy control request trigger, wherein the policy control request trigger includes network slice replacement; and transmitting, to the PCF, information associated with an alternative single-network slice selection assistance information (S-NSSAI) if the network slice replacement has occurred.

6. The method of claim 5, further comprising:

transmitting, to the PCF, an SM policy association ID, if the network slice replacement has occurred.

7. The method of claim 5, further comprising:

determining that the network slice replacement has occurred based on an SM context update message received from an access management function (AMF).

8. A policy control function (PCF) in a wireless communication system, the PCF comprising:

a transceiver; and a controller coupled with the transceiver and configured to:

receive, from a session management function (SMF), a Session Management (SM) policy control create request message, transmit, to the SMF, an SM policy control create response message including information on a policy control request trigger, wherein the policy control request trigger includes network slice replacement, and receive, from the SMF, information associated with an alternative single-network slice selection assistance information (S-NSSAI) if the network slice replacement has occurred.

9. The PCF of claim 8, wherein the controller is further configured to:

receive, from the SMF, an SM policy association ID, if the network slice replacement has occurred.

10. The PCF of claim 8, wherein the controller is further configured to:

receive, from a network function (NF), a subscribe request message for a network slice replacement report request, and transmit, to the NF, an indication for the network slice replacement and the alternative S-NSSAI, if the network slice replacement has occurred.

11. The PCF of claim 10, wherein the reception of the subscribe request message from the NF triggers the PCF to include the network slice replacement in the policy control request trigger.

12. A session management function (SMF) in a wireless communication system, the SMF comprising:

a transceiver; and a controller coupled with the transceiver and configured to:

transmit, to a policy control function (PCF), a Session Management (SM) policy control create request message, receive, from the PCF, an SM policy control create response message including information on a policy control request trigger, wherein the policy control request trigger includes network slice replacement, and transmit, to the PCF, information associated with an alternative single-network slice selection assistance information (S-NSSAI) if the network slice replacement has occurred.

13. The SMF of claim 12, wherein the controller is further configured to:

transmit, to the PCF, an SM policy association ID, if the network slice replacement has occurred.

14. The SMF of claim 12, wherein the controller is further configured to:

determine that the network slice replacement has occurred based on an SM context update message received from an access management function (AMF).

* * * * *